United States Patent
Griffith et al.

(10) Patent No.: US 9,443,219 B1
(45) Date of Patent: Sep. 13, 2016

(54) COURIER MANAGEMENT

(71) Applicant: Amazon Technologies, Inc., Reno, NV (US)

(72) Inventors: Charles M. Griffith, Bainbridge Island, WA (US); Jinqian Li, Bellevue, WA (US); Jonathan J. Shakes, Mercer Island, WA (US); Jin Lai, Beijing (CN)

(73) Assignee: Amazon Technologies, Inc., Seattle, WA (US)

( * ) Notice: Subject to any disclaimer, the term of this patent is extended or adjusted under 35 U.S.C. 154(b) by 396 days.

(21) Appl. No.: 13/889,606

(22) Filed: May 8, 2013

Related U.S. Application Data

(62) Division of application No. 13/070,050, filed on Mar. 23, 2011, now Pat. No. 8,473,326.

(51) Int. Cl.
*G06Q 30/00* (2012.01)
*G06Q 10/08* (2012.01)

(52) U.S. Cl.
CPC ........ *G06Q 10/083* (2013.01); *G06Q 10/0837* (2013.01)

(58) Field of Classification Search
CPC .................................................. G06Q 10/0837
USPC .............. 705/304, 330, 336, 340, 7.32, 7.42
See application file for complete search history.

(56) References Cited

U.S. PATENT DOCUMENTS

| | | | |
|---|---|---|---|
| 2002/0010661 A1* | 1/2002 | Waddington et al. .......... 705/28 |
| 2009/0234665 A1* | 9/2009 | Conkel .............................. 705/1 |
| 2010/0088175 A1* | 4/2010 | Lundquist .................. 705/14.34 |
| 2010/0332402 A1* | 12/2010 | Kantarjiev ............. G06Q 10/08 705/304 |
| 2011/0183652 A1* | 7/2011 | Eng et al. ................... 455/414.1 |
| 2011/0238457 A1* | 9/2011 | Mason ............... G01C 21/3469 705/7.14 |
| 2012/0030133 A1* | 2/2012 | Rademaker ............ G06Q 10/08 705/330 |

* cited by examiner

*Primary Examiner* — Hunter Wilder
(74) *Attorney, Agent, or Firm* — Thomas | Horstemeyer, LLP

(57) ABSTRACT

Disclosed are various embodiments for courier management. For example, in one embodiment, a courier application is executed on a mobile computing device to retrieve a list of stops associated with a courier from a computing device over a network. The list of stops includes a plurality of orders to be delivered, wherein a customer location is associated with each order. The courier application generates user interfaces to facilitate a confirmation that items associated with orders have been delivered, to facilitate an input of a review of the performance of the courier, and to perform other functions.

20 Claims, 13 Drawing Sheets

COURIER MANAGEMENT

CROSS-REFERENCE TO RELATED APPLICATIONS

This application is a utility application that claims priority to co-pending U.S. Patent Application titled, "Courier Management", having Ser. No. 13/070,050, filed Mar. 23, 2011, which is entirely incorporated herein by reference.

BACKGROUND

Courier companies around the world have invested significantly in the past to optimize their delivery network, improve the in-transit visibility, and provide better services to customers upon delivery. However, the visibility of the last-mile operation is poor due to technical constraints and field limitations. When a courier is out for a delivery, it is difficult for a courier company to gain visibility into his activities and provide last minute information to him.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present application describes various embodiments of systems and methods for courier management. For example, in some embodiments, a courier may be managed using a courier application stored on a mobile computing device associated with the courier. The courier application retrieves a listing of one or more stops to be made by the courier from a computing device in communication with the mobile computing device. The list of stops may include a schedule, a list of items, a route, and other details. An occurrence of a delivery, return, or other circumstance relative to the delivery of items is referred to herein as a delivery event. The courier application enables the courier to contact the customer regarding the delivery of items without revealing the contact information of the customer to the courier. Additionally, the courier application enables a customer to purchase multiple items in different sizes or other alternatives and reject the items that do not fit during delivery or that the customer does not wish to keep for some other reason. The courier can then process a refund for the returned items accordingly. The courier application also enables a customer to input a review of the courier into the mobile computing device of the courier while the courier waits. Therefore, the courier can receive feedback on his or her performance directly. In the following discussion, a general description of the system and its components is provided, followed by a discussion of the operation of the same.

Figure 1:
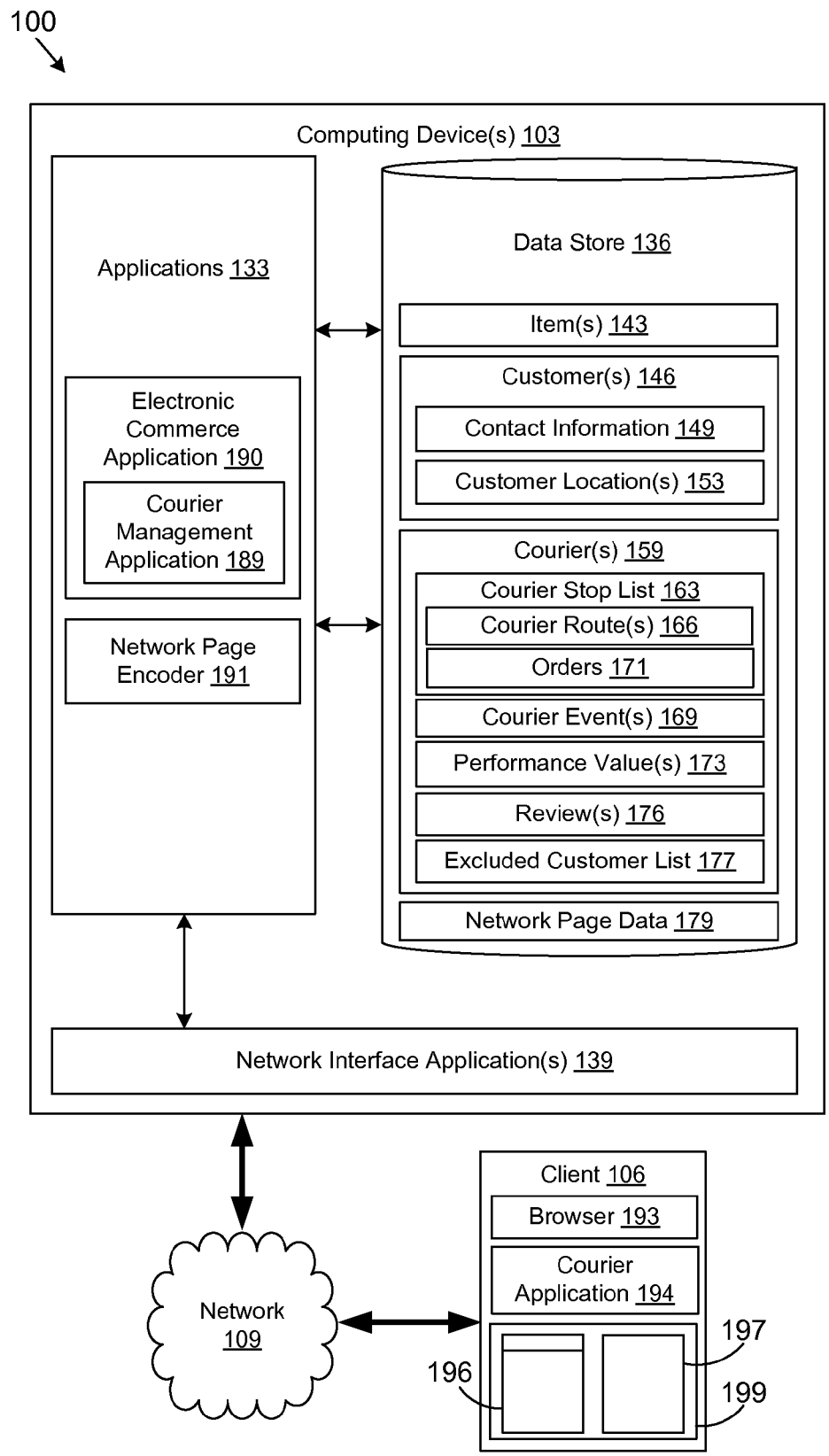
FIG. 1 is a drawing of networked environment according to various embodiments of the present disclosure.

With reference to FIG. 1, shown is a networked environment 100 according to various embodiments. The networked environment 100 includes a computing device 103, a client 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 136 that is accessible to the computing device 103. The data store 136 may be representative of a plurality of data stores as can be appreciated. The data stored in the data store 136, for example, is associated with the operation of the various applications and/or functional entities described below. The components executed on the computing device 103, for example, include application(s) 133, a network interface application(s) 139, and other services, processes, systems, engines, or functionality not discussed in detail herein.

In some embodiments, the applications 133 include an electronic commerce application 190 that is executed in order to facilitate the online purchase of items 143 over the network 109. The electronic commerce application 190 also performs various backend functions associated with the online presence of a merchant in order to facilitate the online purchase of items 143, as will be described. For example, the electronic commerce application 190 may generate one or more network pages 196 such as web pages or other types of network content using a network page encoder 191. The network pages 196 are provided to a client 106 for the purpose of enabling customers 146 to select items 143 for purchase, rental, lease, or other form of consumption, as will be described. The network page encoder 191 encodes network pages 196 for rendering on one or more of the client(s) 106 in response to requests from one or more of the client(s) 106.

One component of the electronic commerce application 190 includes a courier management application 189 that facilitates interaction with remote devices operated by couriers 159 as will be described. As an alternative, the courier management application 189 may be executed separately from the electronic commerce application 190 such as in cases where a merchant that operates the electronic commerce application 190 is a separate entity from the courier.

Specifically, in one embodiment, a merchant that operates the electronic commerce application 190 also acts as their own courier. Alternatively, the merchant that sells items 143 through the electronic commerce application 190 may be a different entity from the courier. As such, the courier management application 189 may be executed separately from the electronic commerce application 190, where the merchant may provide any needed information to the courier in order to implement the courier management application 189 as described herein.

To the extent that the functionality of the courier management application 189 is described in the context of a merchant who acts as their own courier, such description is merely an example of the different contexts that apply. In addition, the courier management application 189 may be employed for entities that perform commerce other than electronic commerce. For example, the courier management application 189 may be employed to manage couriers in the context of a merchant that sells items listed in a paper catalog through a telephone order system or a mail order system.

The data stored in the data store 136 includes, for example, items 143, and, the term "item" 143 may refer to a product, good, or other item 143 that may be offered for sale, purchase, rental, lease, and/or another form of consumption as may be appreciated. Also, the data store 136 stores information related to customers 146 such as customer location(s) 153, contact information 149, and potentially other information. The contact information 149 includes information used to contact a customer 146 such as a phone number, an email address, or other information useful in contacting a customer 146.

A customer location 153 may be associated with a customer 146 explicitly or implicitly from a client 106 associated with a customer 146. As an example of an explicit association, the customer location 153 may be a shipping address associated with the customer 146. Alternatively, the customer location 153 may be obtained from the customer 146 clicking on a location on a graphical map, entry of a zip code, or some other action that explicitly provides the geographic location. The customer location 153 may be provided implicitly as well. Such information may include an internet protocol (IP) address, a telephone number, etc., or other information that may be used for geolocation. Further, the client 106 may include a global positioning system (GPS) device or may determine a customer location 153 that is a current location by way of trilateration using various other mobile base stations having known locations. Alternatively, in some embodiments, a customer location 153 may be stored on the computing device 103 because the customer 146 may have previously registered with the electronic commerce application 190, so an identification of the customer 146, for example, through cookies, security credentials, etc., may point to a customer location 153 corresponding to a customer 146. A customer location 153 may be expressed as a geocode location which is a location expressed as a latitudinal value and a longitudinal value. The customer location 153 may be expressed in terms of an elevation to take into account, for example, multi-story buildings such as high rise buildings and the like.

The data store 136 further stores information related to couriers 159. In some embodiments, a courier stop list 163 may be stored for respective couriers 159. Each courier stop list 163 may include, for example, a courier route 166, one or more orders 171 for items 143 to be delivered, and other information. Stated in other words, the courier stop list 163 includes a listing of one or more shipments to be delivered to customers. When delivering items 143, various courier events 169 may be generated and stored in association with the courier 159. Such courier events 169 include, for example, the delivery of at least one item 143 to a customer 146, a pick-up of at least one item 143 from a customer 146, a failure to deliver or pick-up an item 143 at a customer location 153, and other events related to a courier 159 delivery activities.

In some embodiments, performance value(s) 173 associated with couriers 159 are stored in the data store 136 based at least in part on a performance of a courier 159 in delivering items 143 listed in a courier stop list 163. Further, the performance value(s) 173 may be based at least in part on review(s) 176 provided by customers 146. The reviews 176 may be inputted by customers during the delivery of items 143 or upon the occurrence of other courier events 169 tracked on a client 106 associated with the courier 159, which may be a mobile computing device. A customer may also provide reviews through their own client device through a network portal. The performance value(s) 173 may be further based at least in part on how quickly the courier completes the courier route 166 or information retrieved from a client 106 such as a mobile computing device, for example, associated with the courier 159.

Associated with each courier 159 is an excluded customer list 177. The excluded customer list 177 is a list of customers 146 to which the courier 159 may not deliver items 143, or for which the courier may not perform any other tasks. Therefore, no delivery or other task is allowed to be performed by a courier 159 for a customer if that customer is listed in the excluded customer list 177 of the courier 159. A customer may be added to the excluded customer list 177 by the courier management application 189 responsive to a negative review 176 of the courier provided by the customer, or responsive to a direct request from the customer that they do not wish to receive deliveries from the respective courier 159. In order to determine whether a review 176 is sufficiently negative such that the customer must be placed on the excluded customer list 177 associated with the courier 159, a predefined standard may be established with which to compare reviews 176 to determine whether they are sufficiently negative in order to take such action.

Alternatively, an excluded courier list may be associated with each customer 146 to accomplish the same purpose as the excluded customer list 177. That is to say, no courier listed in an excluded courier list for a given customer will be allowed to deliver items 143 to such customer.

Additionally, the data store 136 stores network page data 179. The network page data 179 includes data used in generating network pages 196 and/or user interfaces 197. Such data may include an order summary, templates, graphics, text, client-side code, style sheets, and so on.

The client 106 is coupled to the network 109. Also, the client 106 may comprise, for example, a processor-based system such as computer system. Such a computer system may be embodied in the form of a desktop computer, a laptop computer, a personal digital assistant, a cellular telephone, a set-top box, a music player, a web pad, a tablet computer system, or other devices with like capability. To this end, the client 106 may comprise a mobile computing device as can be appreciated. Additionally, the client 106 may include various peripheral devices as well. In particular, the peripheral devices may include input devices such as, for example, a bar code scanner, a keyboard, a keypad, a touch pad, a touch screen, a microphone, a scanner, a mouse, a joystick, or one or more push buttons, GPS devices, cameras, elevation sensors, etc. The peripheral devices may also include a display device 199, indicator lights, speakers, etc. A specific display device 199 may be, for example, a cathode ray tube (CRT) screen, liquid crystal display (LCD) screen, a gas plasma-based flat panel display, an LCD projector, or other types of display devices, etc.

The client 106 may be configured to execute various applications such as a browser 193 and/or other applications. The browser 193 may be executed in a client 106, for example, to access and render network pages 196, such as web pages, or other network content served up by the computing device 103 and/or other servers. The client 106 may be configured to execute applications beyond browser 193 such as, for example, a courier application 194, email applications, instant message applications, and/or other applications. When executed in a client 106, the browser 193 renders network pages 196 on a respective display device 199 and may perform other functions. The browser 193 accesses network pages 196, such as web pages or other types of content from the computing device 103 in order to access the functionality of the electronic commerce application(s) 133 and other components implemented in the computing device 103, as will be described.

A network page 196 may include code that generates dynamic content when executed or interpreted in the client 106. The code may be written in any suitable programming language, such as PHP, Perl, Objective C, Java, Ruby, etc. Also, the network page data 179 may include code regarding static content, for example, in hypertext markup language (HTML), extensible markup language (XML), and/or any other language suitable for creating network pages 196. Further, the network pages 196 may include executables obtained from the electronic commerce application(s) 190, which may comprise client-side code to be interpreted or executed within the browser 193 on the client 106. The executable may include dynamic HTML (DHTML), Flash, VB Script, Java Script, Java, Ajax, ActiveX, and/or any other client-side code.

Referring next to FIGS. 2A-2J, examples of user interfaces 197 (FIG. 1) generated in association with the operation of the courier application 194 (FIG. 1) are described. It is understood that the user interfaces 197 shown in FIGS. 2A-2J are merely examples of the many different user interfaces 197 that may be generated to accomplish the various purposes discussed. To this end, the features included in the user interfaces 197 are presented herein as examples, whereas other types of features may be employed instead to accomplish the same underlying purposes. Further, the various features may be manipulated using various input devices such as a keyboard, a mouse, a microphone, and other devices as can be appreciated.

A user interface 197 is rendered on a display device 199 (FIG. 1) of a client 106 (FIG. 1) associated with a courier 159 (FIG. 1). Information stored in a data store 136 (FIG. 1) on a computing device 103 (FIG. 1) may be presented to the courier 159 in the user interface 197. Similarly, information stored in a memory of the client 106 may be presented to the courier 159 in the user interface 197. Also, the user interfaces 197 provide examples of the many different user interfaces 197 that may be created for different types of display devices 199 employed on a respective client 106. For example, a user interface 197 may be formatted differently to fit on a small display screen of a personal digital assistant or other mobile device, etc. Additionally, different graphical user interface (GUI) components may be used.

Alternatively, in some embodiments, the courier application 194 may be stored as an application 133 in the computing device 103 (FIG. 1) instead of in the client 106. A network page may be generated in association with the operation of the network page encoder 191 (FIG. 1), and the network page may include some of the features of a user interfaces 197 described below. The network page may then be communicated over the network 109 (FIG. 1) to the client 106 for rendering by a browser 193 on a display device 199.

FIGS. 2A-2J illustrate examples of user interfaces 197, denoted herein as user interfaces 197a, 197b, 197c, 197d, 197e, 197f, 197g, 197h, 197i, and 197j, rendered by the client 106 in the networked environment 100 of FIG. 1 according to various embodiments of the present disclosure.

Figure 2A:
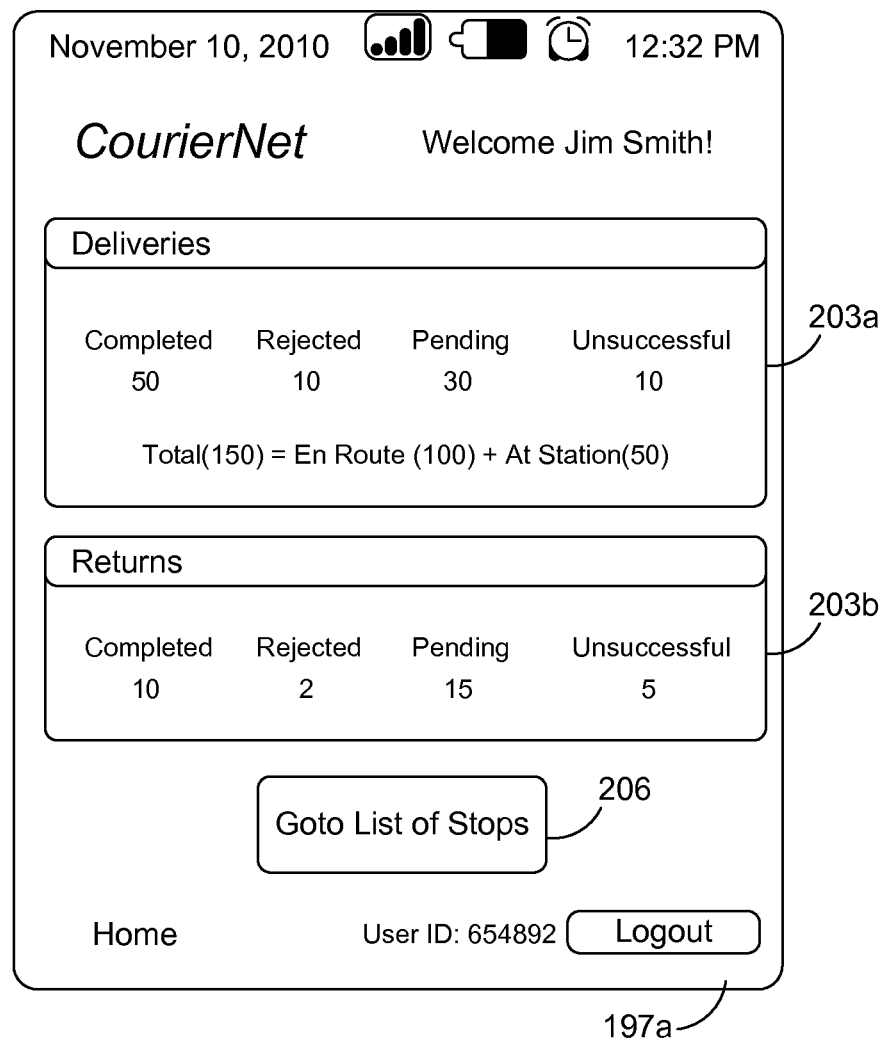
FIGS. 2A-2J are drawings of examples of user interfaces rendered by another client in the networked environment of FIG. 1 according to various embodiments of the present disclosure.

Turning now to FIG. 2A, shown is the user interface 197a associated with a courier including various components 203. Specifically, the user interface 197a includes a delivery assignment component 203a and a customer returns component 203b. The components 203a, 203b are both related to the orders 171 (FIG. 1) that have or have not been delivered by the courier 159 (FIG. 1). The delivery assignment component 203a shows the delivery status of various orders 171 (FIG. 1) (e.g., completed, rejected, pending, unsuccessful, etc.) corresponding to a courier stop list 163 (FIG. 1) associated with the courier 159. The customer returns component 203b shows the status of returned items 143 (FIG. 1) (e.g., completed, rejected, pending, unsuccessful, etc.) in a courier stop list 163. The user interface 197a also includes a "Go to List of Stops" button 206 that may be manipulated by a courier 159 to view a courier stop list 163 of deliveries currently being implemented by a courier 159.

Figure 2B:
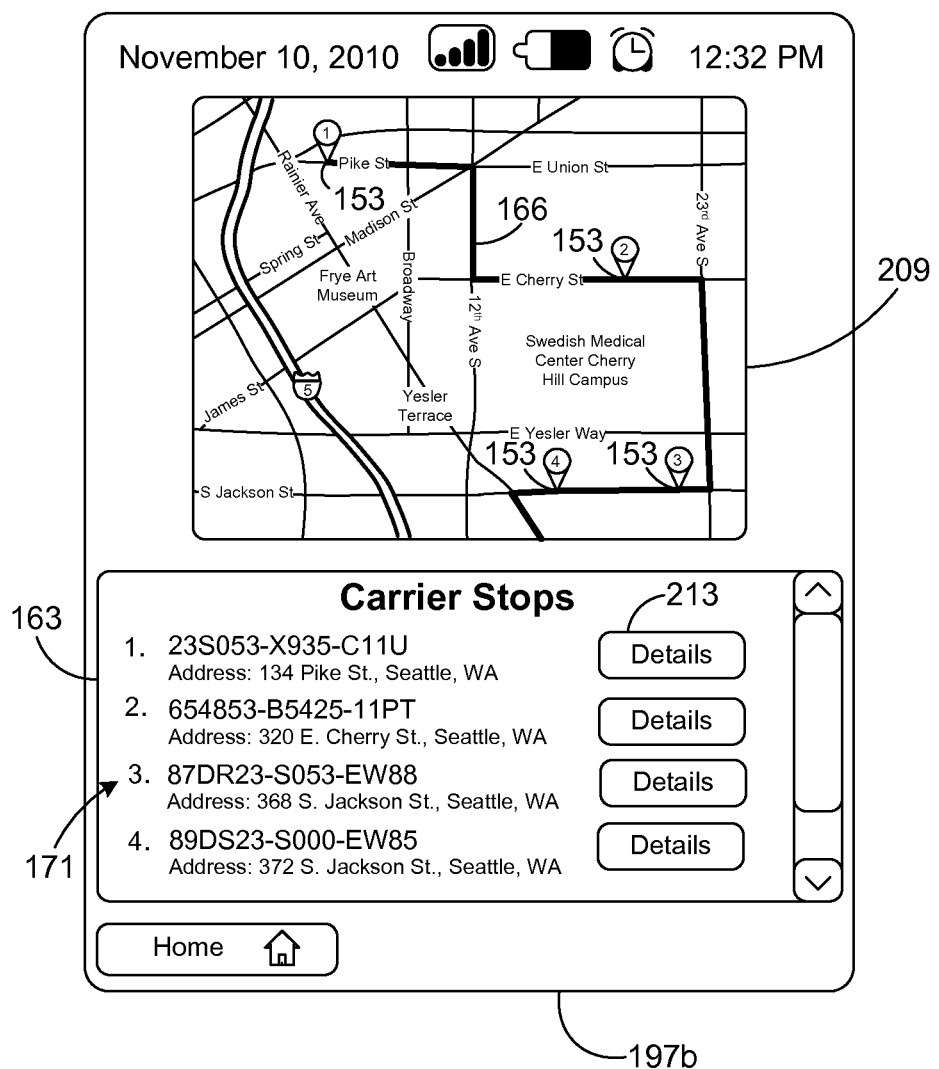

In FIG. 2B, shown is an illustration of an example of the user interface 197b. The user interface 197b includes a rendering of a map 209 that shows a courier route 166 having a plurality of customer locations 153. The courier route 166 is to be followed by a courier 159 to deliver orders 171 (FIG. 1) of items 143 (FIG. 1) to customers 146 (FIG. 1). The user interface 197b also lists the courier stop list 163 currently implemented by the courier 159. The courier stop list 163 lists one or more orders 171 for items 143.

Associated with each order 171 is a customer location 153 where the courier 159 is to deliver the items 143 associated with the order 171. In one embodiment, the customer locations 153 shown in the map 209 are those that correlate with the orders 171 that are visible in the courier stop list 163 at any given moment, where the courier 159 may scroll down the list of orders 171 making up the courier stop list 163 as shown. Specifically, the number of orders 171 in a courier stop list 163 may be more than can be viewed in the available window of the user interface 197b at any given time. To this end, the courier application 194 may be configured to resize the map 209 so as to ensure that all customer locations 153 associated with the currently visible orders 171 are viewable on the map 209. Alternatively, or in addition to such functionality, the map 209 may include components to facilitate manual resizing, centering, or other movement as can be appreciated.

Associated with each order 171 is a "details" button 213 that may be manipulated by a courier 159 to generate a subsequent user interface 197 to view greater details with respect to an individual order 171.

Figure 2C:
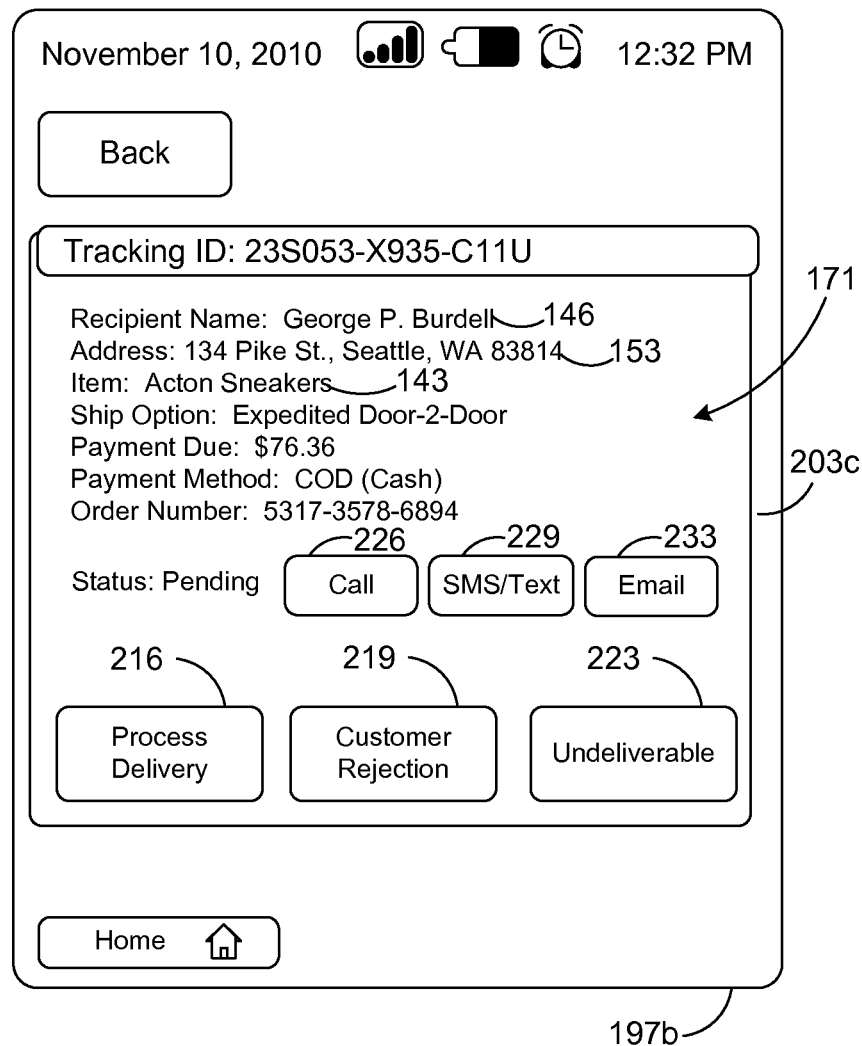

Referring next to FIG. 2C, shown is an example of a user interface 197c that is rendered when a user manipulates a details button 213 (FIG. 2B) associated with a respective order 171. The user interface 197c depicts the details associated with an order 171 including the name of the customer 146 and the customer location 153, where the courier 159 (FIG. 1) is to meet the customer 146 to deliver items 143 associated with the order 171. Other details include the name of the item(s) 143, (e.g., Acton Sneakers), a ship option, payment information, an order number, customer instructions, and other information.

The user interface 197c further includes examples of various components such as a "process delivery" button 216, a "customer rejection" button 219, and an "undeliverable" button 223. The process delivery button 216 may be manipulated by a courier 159 in order to record that a delivery of an order 171 has been made to a given customer 146. The customer rejection button 219 may be manipulated to facilitate processing of a return or rejection of an item 143 in an order 171 by a customer 146 at the time the courier 159 tried to effect delivery of such an item 143. The undeliverable button 223 may be manipulated in order to indicate that an order 171 could not be delivered as scheduled for some reason as will be described.

In addition, the user interface 197c includes components that facilitate communication with a customer 146. Specifically, the user interface 197c includes a "call" button 226 to initiate a telephone call with a customer 146, an "SMS/Text" button 229 to initiate the sending of a text message to the customer 146, or an "email" button 233 to initiate the sending of an email to the customer 146. Alternatively, other components may be presented to initiate communication with a customer 146 via some other medium. According to one embodiment, a manipulation of a respective button 226, 229, 233 causes the courier application 194 to initiate a respective communication application such as a cell phone application, an SMS/text system, or an email system. According to one embodiment, the contact information such as a telephone number, email address, or other contact information is not shown to the courier 159 when invoking a respective communication application so as to protect the privacy of the customer 146.

Figure 2D:
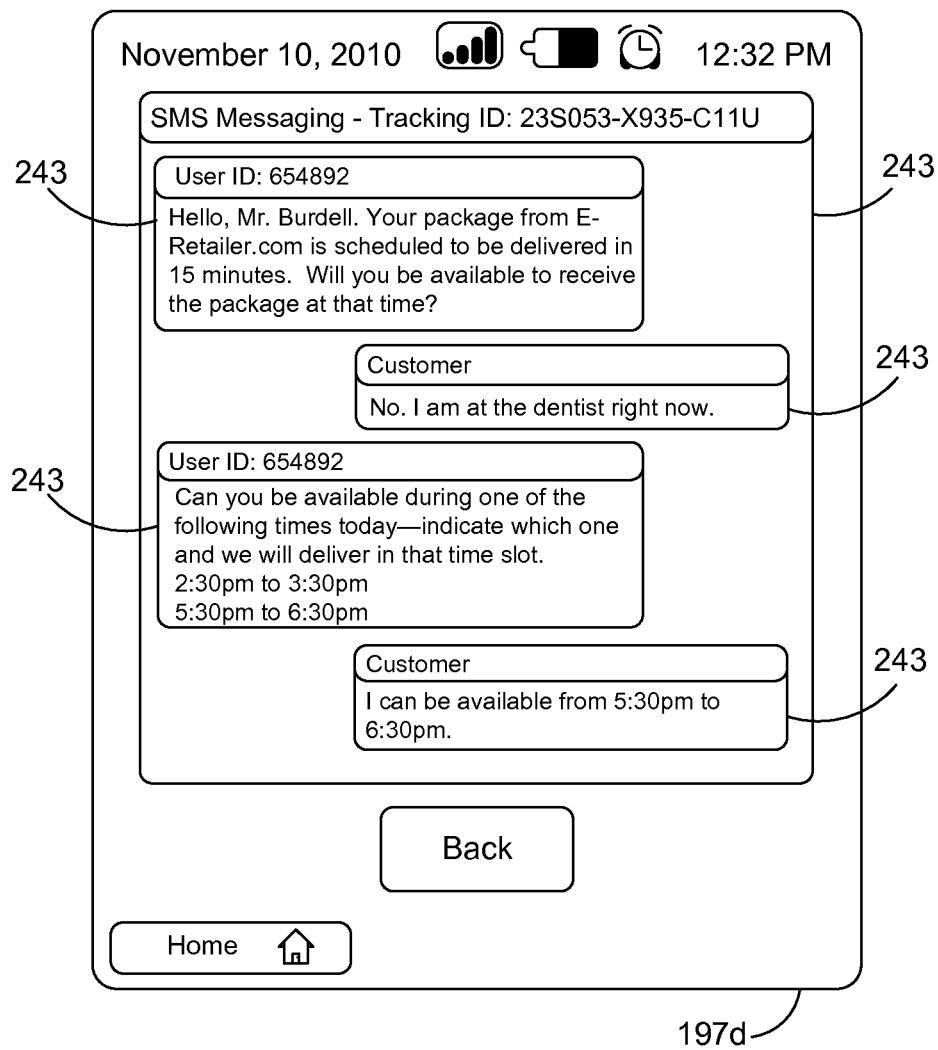

In FIG. 2D, shown is an illustration of an example of a user interface 197d. The user interface 197d shows a communication string of text messages 243 between a courier 159 (FIG. 1) and a customer 146 (FIG. 1). According to one embodiment, the contact information 149 (FIG. 1) associated with the customer 146 is not disclosed to the courier 159, and therefore, the contact information 149 associated with the customer 146 may remain private with respect to the courier 159. This may be accomplished by incorporating the functionality of a communication application within the courier application 194 itself, or by configuring the courier application 194 to interface with communications applications executed in the client 106 in order to facilitate communication between the courier 159 and the customer 146.

Figure 2E:
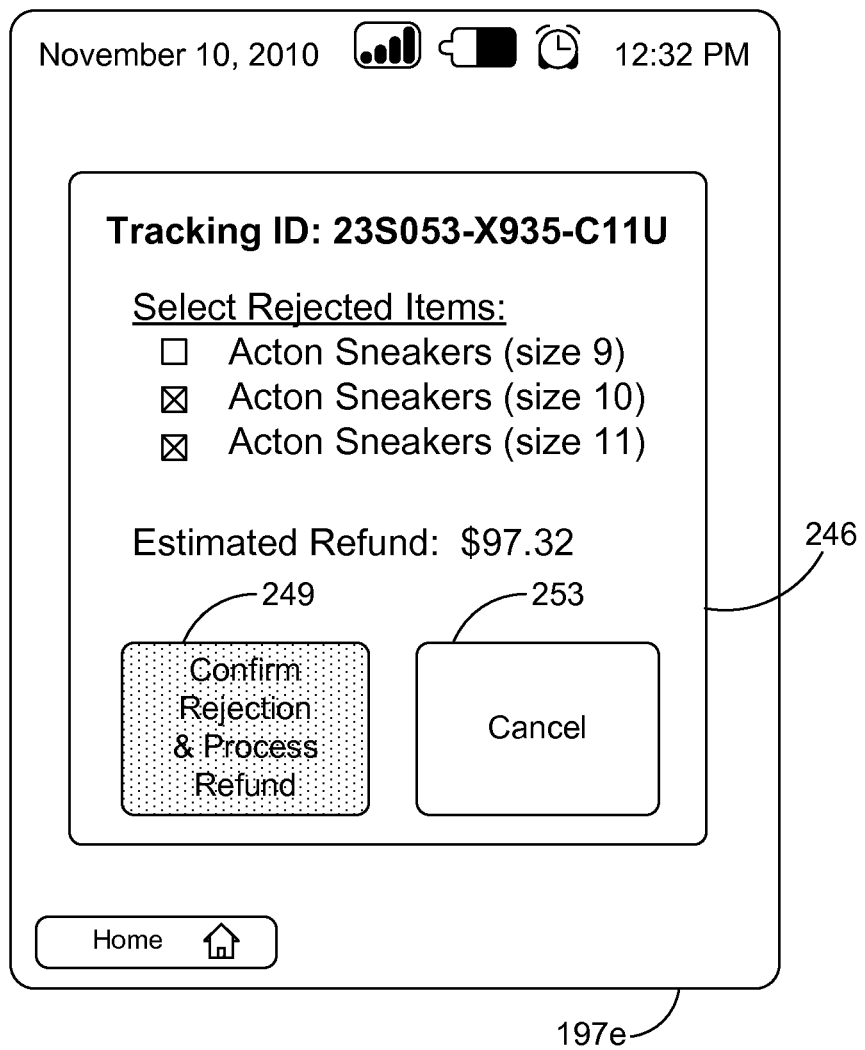

In FIG. 2E, shown is an illustration of an example of a user interface 197e presented when a courier 159 (FIG. 1) manipulates the customer rejection button 219 (FIG. 2C) according to one embodiment. The user interface 197e includes a window 246 that facilitates a specification that one or more items 143 (FIG. 1) associated with an order 171 (FIG. 1) have been rejected when delivery was attempted by a courier 159 (FIG. 1). Once the items 143 of an order 171 are indicated as rejected, the courier 159 may manipulate the confirm rejection button 249. If the customer 146 changes their mind or the rejection is not to occur after all, then the courier 159 may manipulate the cancel button 253 to return to the prior user interface 197c (FIG. 2C).

To provide an example, a courier 159 may attempt to deliver a plurality of items 143, each item 143 being the same, but having a different size such as might be the case with clothing or shoes. When delivery is attempted, the customer 146 (FIG. 1) may select the item(s) 143 that fit and reject the item(s) 143 that do not fit. Accordingly, the customer 146 is enabled to partially reject the item(s) 143, by both accepting a number of the item(s) 143 and returning a number of the item(s) 143.

Figure 2F:
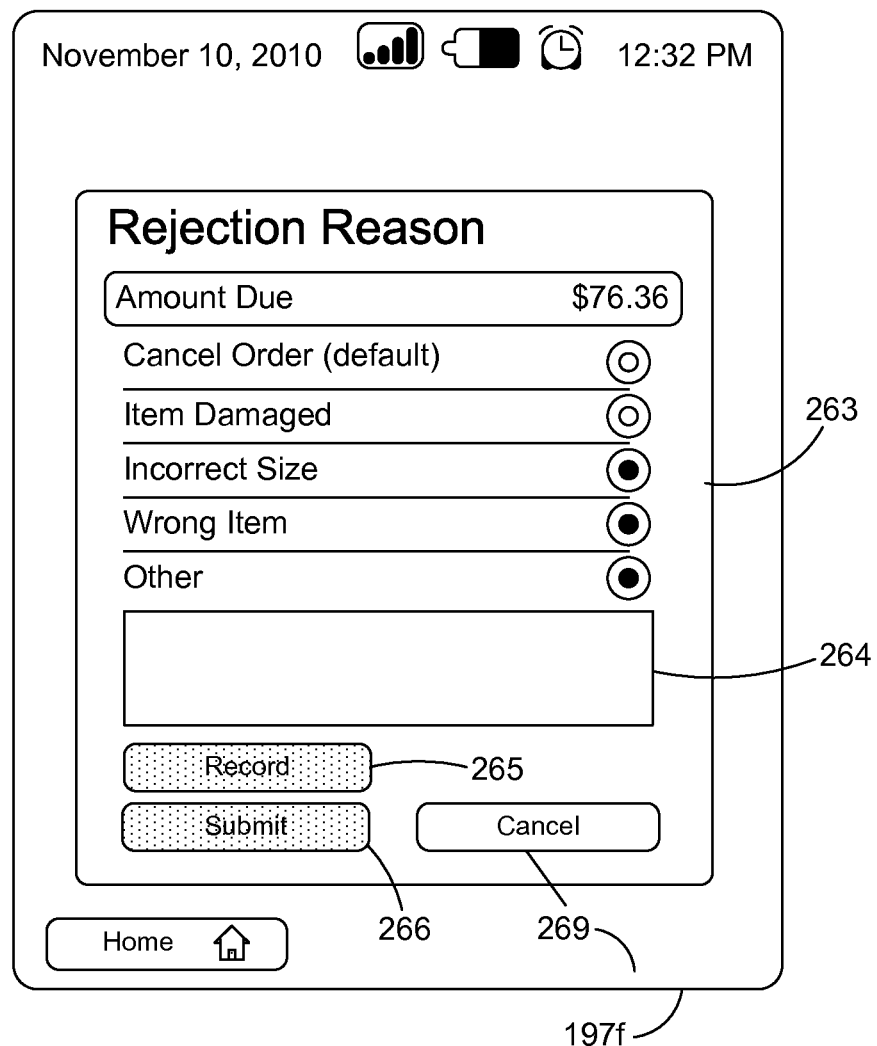

With reference to FIG. 2F, shown is another example of a user interface 197f that is rendered on the client 106 (FIG. 1) when a user manipulates the confirm rejection button 249 (FIG. 2E) described above according to various embodiments. The user interface 197f facilitates the entry of reasons why an item 143 has been rejected by a customer 146. To this end, the user interface includes multiple rejection options 263, where the courier 159 may select one or more such options. In addition, the rejection options 263 include an "other" rejection option with a text box 264 in which the customer can enter their own reason why they are rejecting one or more items 143. Also, a "Record" button 265 is provided that, once manipulated, causes the client 106 to record a spoken reason why the item 143 is being rejected. Once a reason for the rejection of one or more items 143 is indicated by a customer, the courier 159 may select the "submit" button 266 to submit the data reflecting the customer rejection of certain items 143 and the one or more reasons for the rejection to the courier management application 189 (FIG. 1) or other application to be stored in the data store 136 (FIG. 1) in association with the respective order 171 (FIG. 1). Alternatively, the rejection of the items 143 may be canceled by manipulating the cancel button 269. Examples of the rejection options include a cancellation, a damaged item 143, a wrong item 143, a variation in the item relative to the description originally provided to the customer, and other reasons for rejecting an item 143 during delivery. The rejection of one or more items 143 is stored as one of the courier events 169 (FIG. 1).

In one embodiment, the reasons for rejection of an item 143, whether in text form or audio form, may be communicated to a merchant and displayed or otherwise made accessible to other buyers in association with listings of the items 143 through an electronic commerce application 190 or other application. In this way, the reasons for rejection of items 143 that relate to the items 143 themselves may be associated with the items 143 and may better inform other purchasers.

Figure 2G:
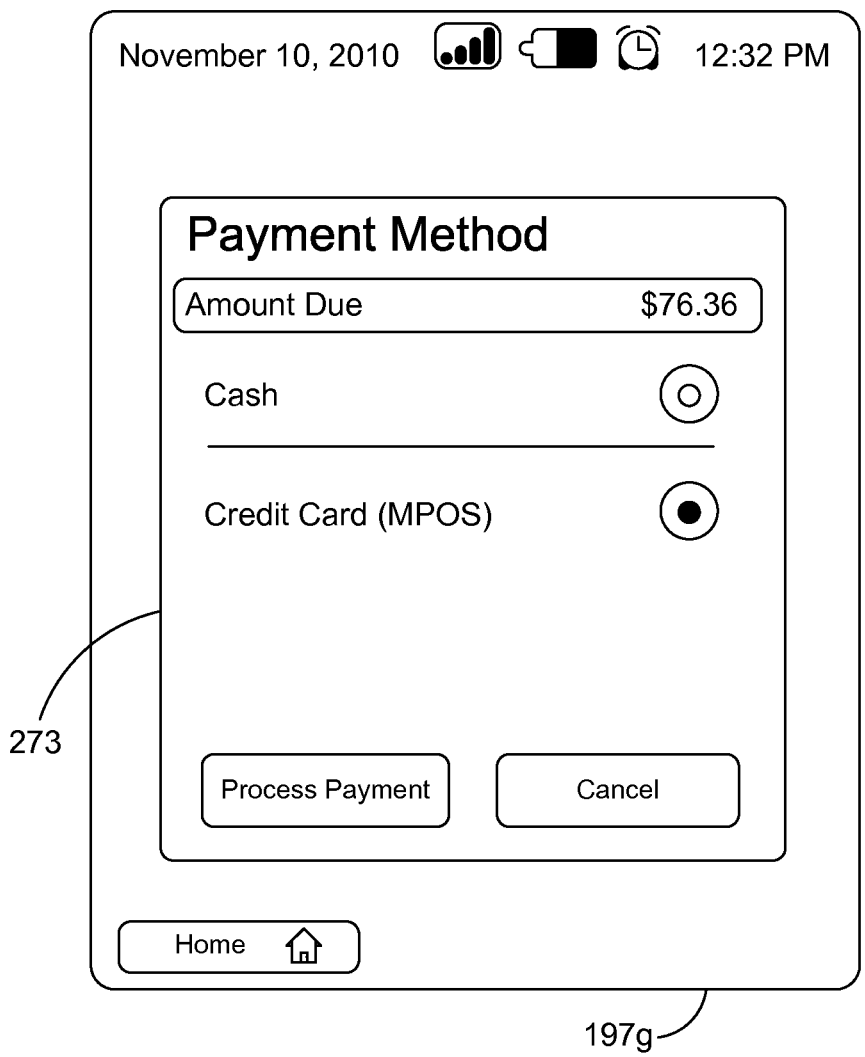

In FIG. 2G, shown is an illustration of an example of a user interface 197f that is rendered in the client 106 (FIG. 1) upon a manipulation of the process delivery button 216 (FIG. 2C) if there is a balance owed by the customer 146 (FIG. 1) for the items 143 (FIG. 1) that are the subject of the delivery. For example, the balance owed may be related to the purchase of the items 143 or it may involve shipping charges, etc. The user interface 197f includes one or more components 273 that facilitate processing a payment associated with the delivery of items 143. In other embodiments, the user interface 197g may be presented to process a refund. In some embodiments, the user interface 197g is configured to process a payment and/or refund in connection with a partial rejection of items 143 during a delivery of items 143. The user interface 197g may invoke other user interfaces 197 that facilitate running a credit card or taking other action to receive payment. The user interface 197g may also be configured to enable the courier 159 (FIG. 1) to negotiate a price with the customer 146 by providing a communication link between the courier 159 and a merchant.

Figure 2H:
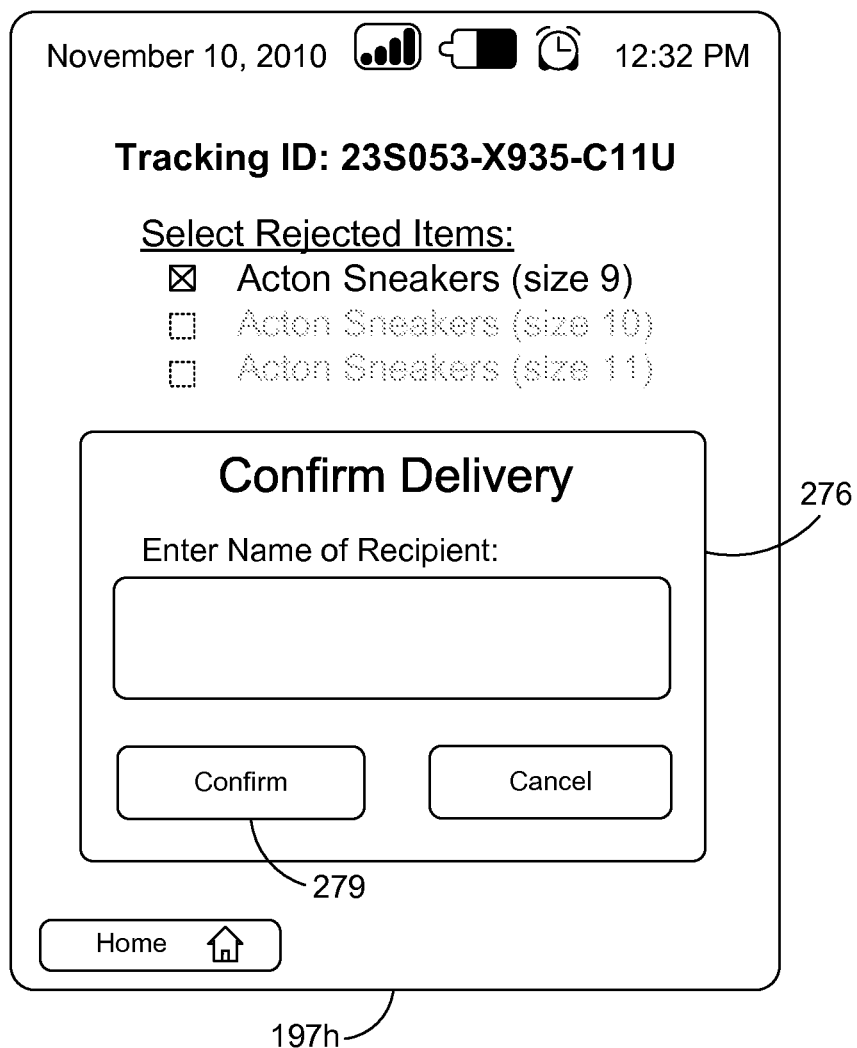

In FIG. 2H, shown is an illustration of an example of a user interface 197h that is rendered when payment is completed as discussed with reference to FIG. 2G. The user interface 197h facilitates confirming that the delivery of an item 143 (FIG. 1) to a customer has been completed. The user interface 197h includes a recipient entry box 276 in which the courier 159 (FIG. 1) may enter the name of the person receiving the delivery. The name may be entered using a keyboard or it may be hand written using a stylus, etc. In the event that part of the items 143 of an order have been rejected, the delivery confirmation relates to those items 143 actually received as depicted, for example, in FIG. 2H. Once the recipient name has been entered, the courier 159 may manipulate the "confirm" button 279, thereby causing the courier application 194 (FIG. 1) to send a message to the courier management application 189 (FIG. 1) informing the same that the delivery of one or more items 143 was successful. Such information may be stored in the data store 136 (FIG. 1) as a courier event 169 (FIG. 1).

Figure 2I:
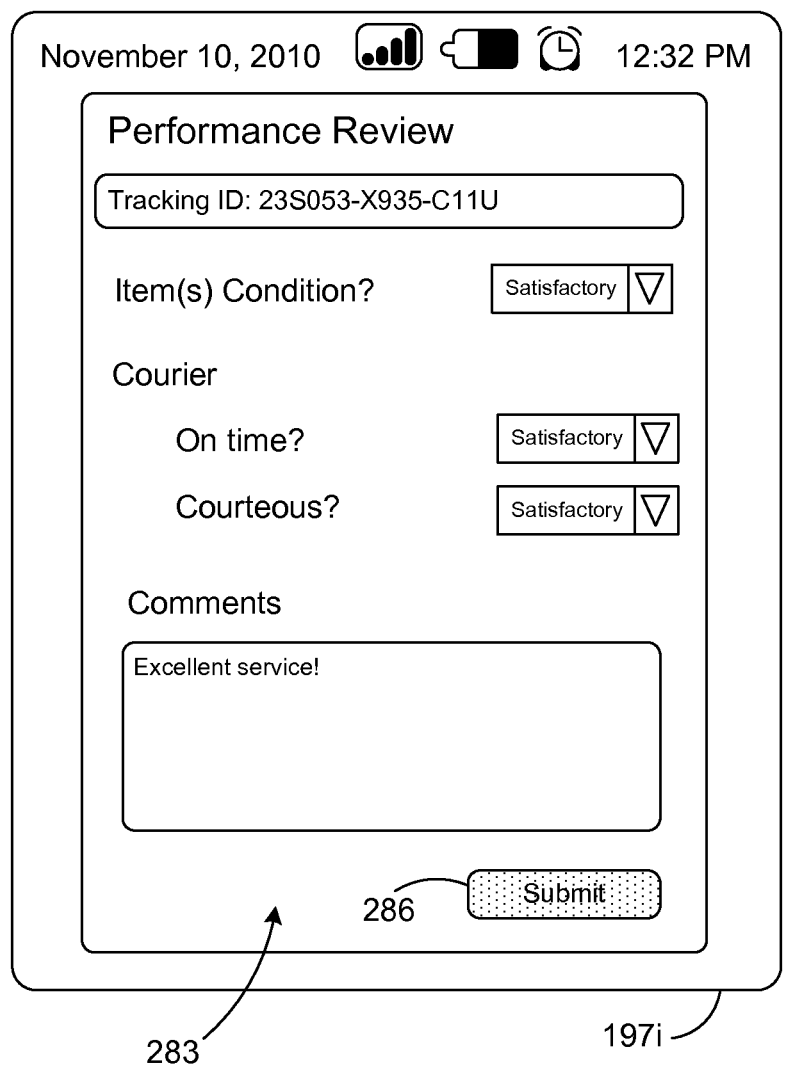

In FIG. 2I, shown is an illustration of an example of a user interface 197i that is generated upon a manipulation of the confirm button 279 (FIG. 2H) according to one embodiment. The user interface 197i includes various input components 283 to facilitate entering a review 176 (FIG. 1) of the performance of the courier 159 (FIG. 1) by a customer 146 (FIG. 1). In addition, various components may be presented that facilitate an input of a request not to receive a delivery from the respective courier 159 in the future. The input components 283 include, for example, picklists of performance descriptions and a text box to enter specific comments. Alternatively other types of input components 283 may be used.

In one approach, the courier 159 may hand a mobile device to the customer 146 so that they can enter the review 176. Alternatively, a customer 146 may input a review 176 on a network page provided to a client 106 (FIG. 1) associated with the customer 146 after the courier 159 has left. Alternatively, the customer 146 may verify the review 176 inputted in the mobile device by viewing the review 176 on a network page provided to a client 106 associated with the customer 146 at a later time to ensure that the review 176 was the one they entered and not illicitly entered by the courier 159. In addition, a copy of a review may be communicated to a customer via an email, text message (SMS), or other messaging format for the same purpose. Once a review has been entered, the submit button 286 may be manipulated to cause the review information and other delivery confirmation information to be sent to the computing device 103 (FIG. 1). The data indicating a confirmation of the delivery may be stored as a courier event 169 (FIG. 1) in association with the courier 159, the order 171, and/or other data. The review data obtained may be stored as one of the reviews 176 associated with the respective courier 159 as described above. In addition, if a customer requests that they do not wish for the respective courier 159 to deliver packages to them in the future, the courier management application 189 (FIG. 1) takes steps to add the customer to the excluded customer list 177 (FIG. 1) associated with the courier 159. Alternatively, the respective courier 159 may be added to an excluded courier list associated with the respective customer.

Figure 2J:
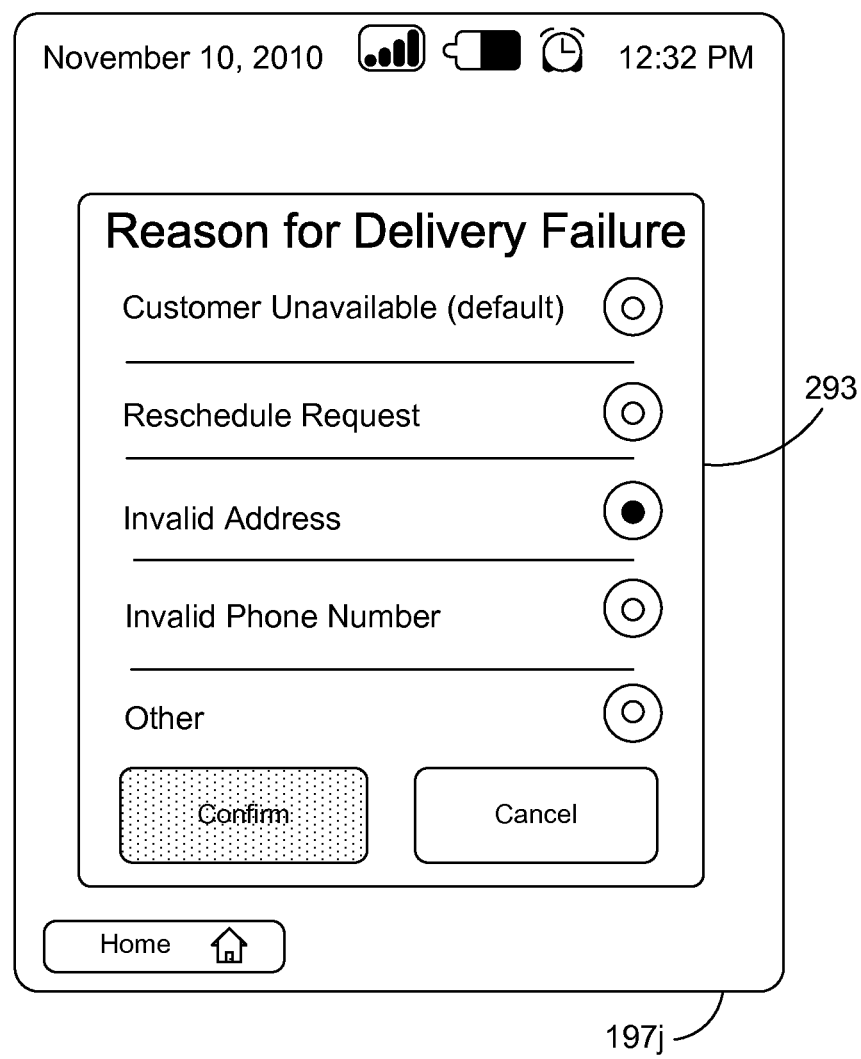

In FIG. 2J, shown is an illustration of an example of a user interface 197j that is rendered in response to a manipulation of the undeliverable button 223 (FIG. 2C) described above. The user interface 197j includes input components 293 that facilitate a specification of a reason for the failure to deliver one or more items 143 (FIG. 1) of a respective order 171 (FIG. 1). Examples of reasons that a delivery may not be completed include an unavailable customer 146 (FIG. 1), a request to reschedule from a customer 146, an invalid address, invalid contact information 149 (FIG. 1) for the customer 146, and other reasons that a delivery may fail to be completed.

Figure 3:
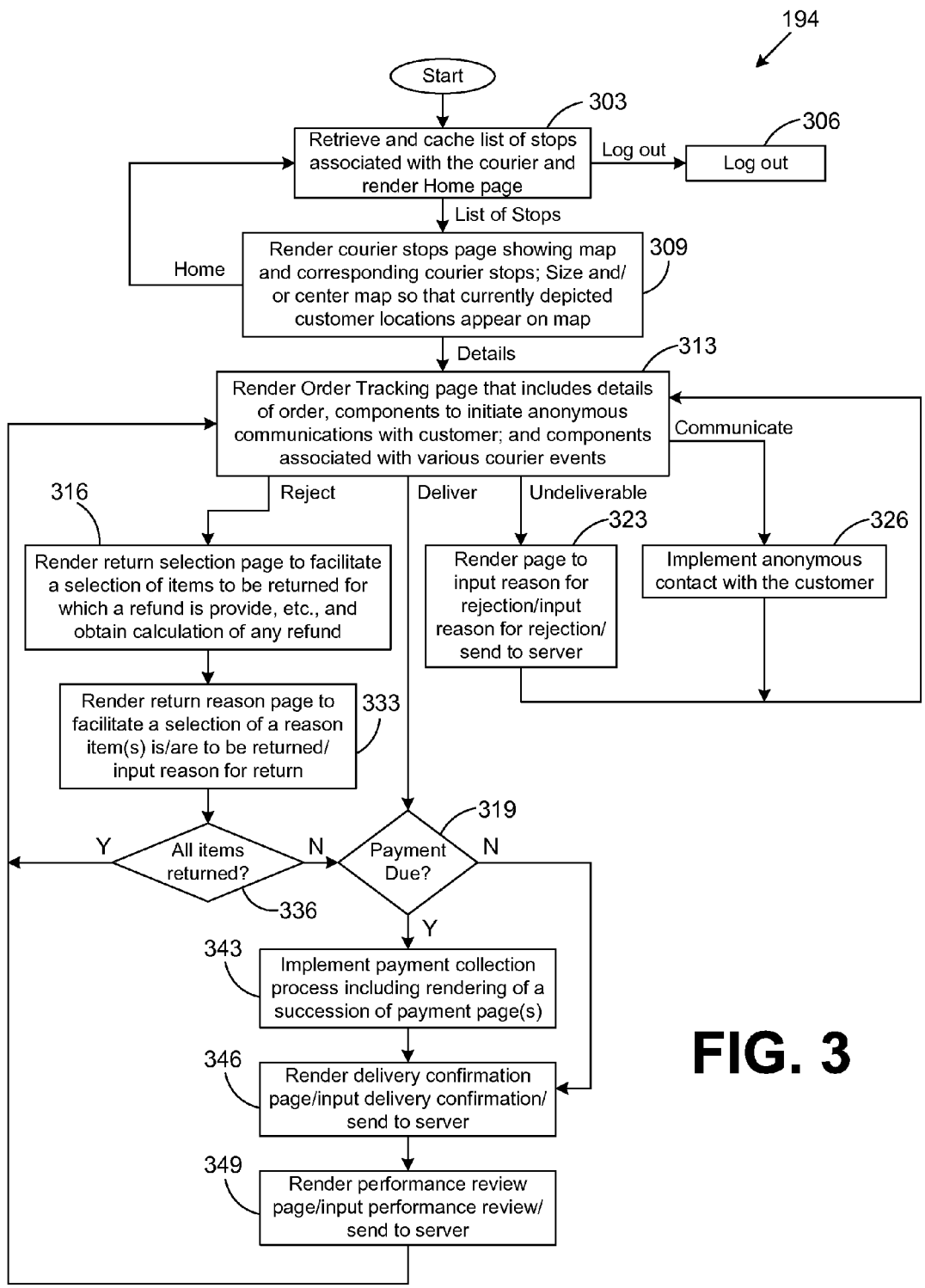
FIG. 3 is a flowchart illustrating one example of functionality implemented as portions of courier application executed in a client in the networked environment of FIG. 1 according to various embodiments of the present disclosure.

Referring next to FIG. 3, shown is a flowchart that provides one example of the operation of a portion of the courier application 194 according to various embodiments. It is understood that the flowchart of FIG. 3 provides merely an example of the many different types of functional arrangements that may be employed to implement the operation of the portion of the courier application 194 as described herein. As an alternative, the flowchart of FIG. 3 may be viewed as depicting an example of steps of a method implemented in the client 106 (FIG. 1) according to one or more embodiments. In addition, the flowchart of FIG. 3 provides one example of how a courier 159 (FIG. 1) interacts with a courier application 194 when they go about delivering items 143 (FIG. 1), where it is understood that the flow may differ depending on specific circumstances. In addition, it is understood that the user interfaces 197 described above are merely examples of the various types of interfaces that may be employed to accomplish the same purposes. Consequently, the extent that a user interface 197 is mentioned below in conjunction with the flow of FIG. 3, it is understood that such user interfaces 197 are merely discussed as examples. Also, as described below, the user interfaces 197 are linked together by virtue of various graphical components such as buttons and the like that act as links. It is understood, that other flows and linkages between various user interfaces 197 (FIG. 1) may be employed other than those described herein to accomplish the same functionality.

Beginning with box 303, the courier application 194 retrieves all data indicative of a given courier stop list 163 (FIG. 1) from the computing device 103 and caches the same in local memory in the client 106, where the courier stop list 163 is associated with the respective courier 159 who is to make one or more deliveries specified in the courier stop list 163. Also, the courier application 194 renders the home page represented, for example, by the user interface 197a depicted in FIG. 2A as described above. In this respect, box 303 represents the functionality of the courier application 194 at startup when a courier 159 is to begin a task of delivering various items 143 to customers as described above.

Assuming that a user clicks on a logout button depicted in the user interface 197a, then the courier application 194 proceeds to box 306 where it performs such task to log the courier 159 out of the system. To this end, the courier 159 may be required to log in by way of an appropriate authentication mechanism in order to use the courier application 194 by providing an appropriate username and password or other authentication information. This is done to ensure that unauthorized personnel do not access the functionality of the courier application 194.

Assuming however when viewing the user interface 197a that the user manipulated the "Go to List of Stops" button 206 (FIG. 2A), then courier application 194 proceeds to box 309. In box 309, the courier application 194 renders the courier stops page as depicted, for example, in FIG. 2B in the form of user interface 197b described above. In one embodiment, the courier application 194 automatically sizes and/or centers the map 209 (FIG. 2B) so that the visible customer locations in the courier stop list 163 appear on the map 209, given that only part of the courier stop list 163 is visible where the remainder of the courier stop list 163 may be made visible by scrolling. When viewing the user interface 197b, the courier application 194 may provide for components that allow the user to zoom in and out with the map, and otherwise move the map in various directions as desired by the courier 159.

Assuming that a user clicks on one of the details buttons 213 (FIG. 2), then the courier application 194 proceeds to box 313. In box 313, the courier application 194 renders an order tracking page represented by the user interface 197c (FIG. 2C) according to various embodiments. As described above, the user interface 197c includes details of a given order and components to initiate anonymous communication with the customer such as the call button 226 (FIG. 2C), the SMS/Text button 229 (FIG. 2C), and the email button 233 (FIG. 2C). Also, user interface 197c includes various components that are manipulated by couriers 159 in association with various courier activities such as the process delivery button 216 (FIG. 2C), the customer rejection button 219 (FIG. 2C), and the undeliverable button 223 (FIG. 2C), as described above.

If the courier 159 manipulates the customer rejection button 219, then the courier application 194 proceeds to box 316. If the courier 159 manipulates the process delivery button 216, then the courier application 194 progresses to box 319. Similarly, if the courier 159 manipulates the undeliverable button 223, then the courier application 194 progresses to box 323. Finally, if the courier 159 manipulates any one of the call button 226, SMS/Text button 229, or email button 233, the courier application 194 progresses to box 326 as shown.

In box 316, the return selection page that is represented by the user interface 197e (FIG. 2E) is rendered on the client 106 to facilitate the selection of items 143 to be returned for which a refund is to be provided. Thereafter, in box 333, assuming that the courier 159 manipulates the confirm rejection button 249, the courier application 194 renders the return reason page represented, for example, by the user interface 197f (FIG. 2F) to facilitate a selection of the reason items 143 are to be returned and to submit such reasons to the computing device 103 for storage as a respective courier event 169 as described above.

In addition, the courier application 194 may communicate with the courier management system 189 and/or the electronic commerce application 190 (in the case that the merchant acts as their own courier) in order to implement a calculation of any refund owed to the customer. Such a calculation may take into account promotions that are to be rescinded, taxes that have been paid, and other aspects that may apply to a refund calculation. For example, a customer might take advantage of a promotion where, if they purchased item A, then they would receive item B at a reduced price or for free. If the customer returns item A, but keeps item B, then the refund would need to be calculated based on the fact that the promotion does not apply. That is to say, if a customer received a discount on item B, they might have to accept a reduction of the discount due to the fact that the promotion is no longer applicable. In addition, there may be many other factors that are considered in calculating a refund.

Thereafter, the courier application 194 progresses to box 336 in which it is determined whether all items 143 associated with the respective order depicted in the user interface 197c (FIG. 2C) described above are to be returned. If so, then the courier application 194 reverts to box 313 to render the order tracking page represented by the user interface 197c as described above. However, if not all items 143 are to be returned and at least one item 143 is to be delivered to the customer, then the courier application 194 progresses to box 319 in order to allow the courier 159 to specify that delivery has been made with respect to such item 143.

In addition, if items 143 are to be returned as determined in box 316, such information is communicated to the computing system 103 and the respective courier stop list 163 is updated appropriately both in the client 106 and the computing device 103. Further, the electronic commerce application 190 is configured to process a refund appropriately, assuming that the courier 159 can confirm that the item 143 is returnable. In order to process a refund, the courier management application 189 that interacts directly with the courier application 194 may also interact with other components of the electronic commerce application 190 to implement the refund. This is advantageous as refunds may be processed immediately given that the courier 159 may act as a third party to verify that the item 143 being returned is in the condition in which it was delivered.

Assuming that the courier has manipulated the process delivery button 216 in the user interface 197c as described with respect to box 313, the courier application 194 progresses to box 319. In addition, the courier application 194 can progress to box 319 from box 336 described above. In box 319, it is determined whether there is a payment due on the current order 171 (FIG. 1) being delivered. If so, then the courier application 194 progresses to box 343. Otherwise, the courier application 194 progresses to box 346.

In box 343, the courier application 194 implements payment collection processes that include rendering of one or more payment pages on the display device 199 (FIG. 1) to implement the receipt of a payment such as a credit card payment from a customer. Thereafter, the courier application 194 progresses to box 346. Note that one of the payment pages may comprise, for example, the user interface 197g (FIG. 2G).

In box 346, the courier application 194 renders a delivery confirmation page such as that represented by user interface 197h (FIG. 2H) described above to input the confirmation of a delivery of one or more items 143 of an order 171 to the customer. Upon entry of the name of the recipient and items 143 delivered, the courier 159 may manipulate the confirm button 279 to cause the courier application 194 to send such information to the computing device 103 to be stored as a courier event 169 or in some other location. In addition, the respective courier stop list 163 is updated appropriately both in the client 106 and the computing device 103.

Then, assuming that the confirm button 279 has been manipulated, the courier application 194 proceeds to box 349 to render the performance review page represented by the user interface 197i (FIG. 2I), for example, to facilitate an input of a review of the performance of the courier 159. In one embodiment, a reviewer may select an option that indicates that they do not wish to have the same courier 159 deliver packages to them in the future. Alternatively, the reviewer may input various star ratings or other indications of performance as can be appreciated.

When the reviewer manipulates the submit button 286 (FIG. 2), the courier application 194 sends the review to the computing device 103 to be stored as one of the reviews 176 in the data store 136. In addition, if a customer has indicated that they do not wish for the respective courier 159 to deliver to them in the future, the courier management application 189 is configured to include the customer on the excluded customer list 177 associated with the courier 159. Alternatively, the courier 159 may be added to an excluded courier list associated with the respective customer. Thereafter the courier application 194 reverts back to box 313 as shown so that the courier can initiate any other appropriate actions with respect to such order 171. Alternatively, the courier application 194 may revert back to box 309, so that they can determine the next order 171 to be delivered as depicted in the map 209 and in the courier stop list 163 as described above.

Assuming that the courier 159 has manipulated the undeliverable button 223 when the courier application 194 is in box 313, then the courier application 194 proceeds to render user interface 197j (FIG. 2J) to facilitate an input of a reason why one or more items 143 associated with an order 171 could not be delivered. Once the reason has been input and confirmed by manipulating an appropriate component in the user interface 197j, the courier application 194 sends the information to the computing device 103 to be stored as one of the courier events 169 as described above. Thereafter, the courier application 194 reverts back to box 313 as shown.

Finally, assuming that the courier 159 has manipulated any one of the call button 226, SMS/Text button 229, or email button 233 (FIG. 2C) when in box 313, then the courier application 194 proceeds to box 326 to implement the anonymous communication with the respective customer. This may involve, for example, rendering various user interfaces such as user interface 197d to facilitate communication with the customer 146 anonymously without giving customer's contact information to the courier 159. Stated another way, the contact information of the customer is inaccessible by the courier 159. This prevents the courier 159 from using such contact information for other purposes not approved by the customer 146. Note that in implementing communication between the courier 159 and the customer 146, the courier application 194 may invoke another communication type application in the client 106 to implement the communication itself. Once the communication with the customer 146 has ended, then the courier application 194 reverts back to 313 as shown.

Figure 4:
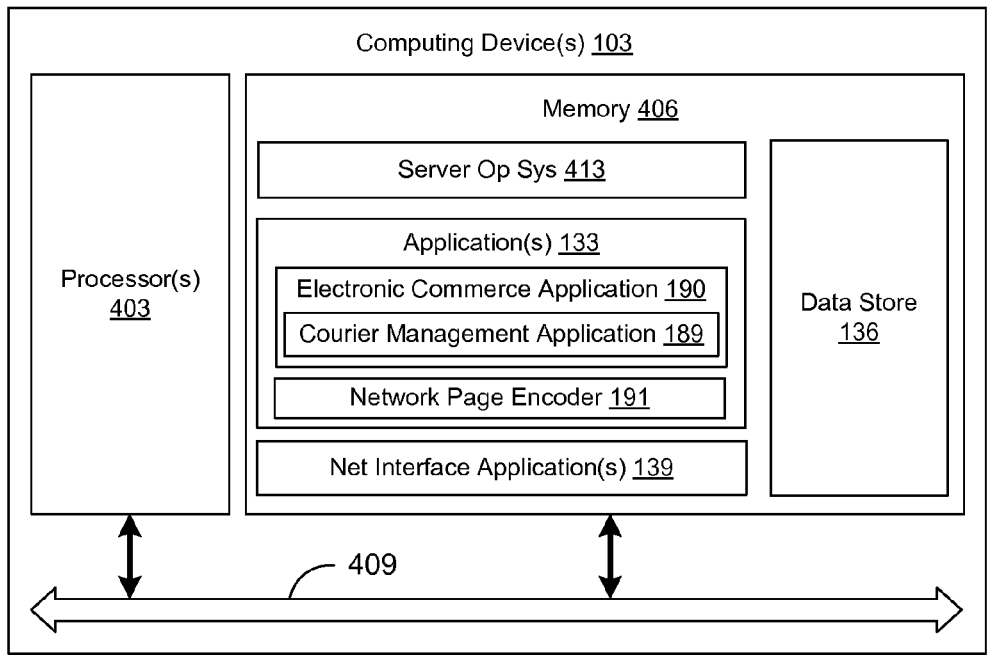
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are applications 133 including the electronic commerce application 190 with the courier management application 189, the network page encoder 191, and potentially other applications. Also stored in the memory 406 may be a data store 136 and other data. In addition, an operating system 413 may be stored in the memory 406 and executable by the processor 403.

Figure 5:
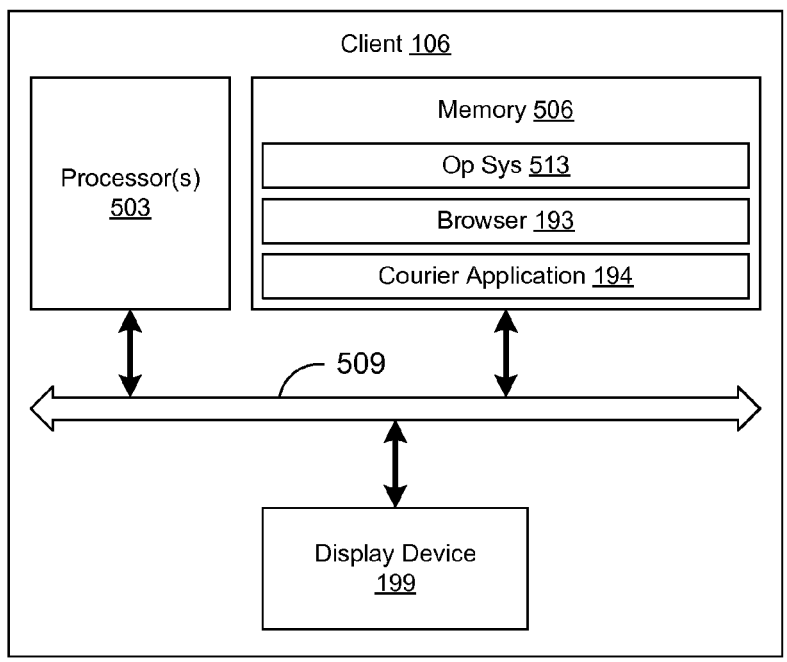
FIG. 5 is a schematic block diagram that provides one example illustration of a client employed in the networked environment of FIG. 1 according to various embodiments of the present disclosure.

With reference to FIG. 5, shown is a schematic block diagram of the client 106 according to an embodiment of the present disclosure. The client 106 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the browser 193, the courier application 194, and potentially other applications. Also, various data may be stored in the memory 506 and accessed by the processor 503. In addition, an operating system 513 may be stored in the memory 506 and executable by the processor 503.

It is understood that there may be other applications that are stored in each of the memories 406/506 and are executable by the respective processors 403/503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the respective memories 406/506 and are executable by the processors 403/503. In this respect, the term "executable" means a program file that is in a form that can ultimately be run by a respective processor 403/503. Examples of executable programs may be, for example, a compiled program that can be translated into machine code in a format that can be loaded into a random access portion of a memory 406/506 and run by a processor 403/503, source code that may be expressed in proper format such as object code that is capable of being loaded into a random access portion of a memory 406/506 and executed by a processor 403/503, or source code that may be interpreted by another executable program to generate instructions in a random access portion of one of the memories 406/506 to be executed by a respective processor 403/503, etc. An executable program may be stored in any portion or component of a respective memory 406/506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 406/506 is defined herein as including both volatile and nonvolatile memory and data storage components. Volatile components are those that do not retain data values upon loss of power. Nonvolatile components are those that retain data upon a loss of power. Thus, each memory 406/506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 403/503 may represent multiple processors and each memory 406/506 may represent multiple memories that operate in parallel processing circuits, respectively. In such a case, each local interface 409/509 may be an appropriate network 109 (FIG. 1) that facilitates communication between any two of the multiple processors, between any processor and any of the multiple memories, or between any two memories, etc. Such a local interface 409/509 may comprise additional systems designed to coordinate this communication, including, for example, performing load balancing. Each processor 403/503 may be of electrical or of some other available construction.

Although the applications 133 including the electronic commerce application 190, and the network page encoder 191, the courier application 194, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the courier management application 189 and the courier application 194. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the courier management application 189 and the courier application 194, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a courier application executable in at least one mobile computing device, wherein, when executed, the courier application causes the at least one mobile computing device to perform a method comprising:

retrieving, by the at least one mobile computing device, a list of stops associated with a courier from a courier computing device, the list of stops identifying a plurality of orders to be delivered, individual ones among the plurality of orders being associated with a customer location and a customer, the customer location being expressed as a latitudinal value, a longitudinal value, and an elevation value, wherein at least one of the plurality of orders specifies a plurality of items;

receiving, by the at least one mobile computing device, system location data from a global position system (GPS) receiver and an elevation sensor;

rendering, by the at least one mobile computing device, on a display of the at least one mobile computing device a user interface including at least a portion of the list of stops in the at least one mobile computing device;

rendering, by the at least one mobile computing device, a courier route to the customer location on a map in the user interface based at least in part on the system location data and the customer location;

receiving, by the at least one mobile computing device, a rejection of at least one item among the plurality of items from the user interface at the customer location;

communicating, by the at least one mobile computing device over a wireless network, the rejection at the customer location to the courier computing device in response to receiving the rejection, the courier computing device executing an electronic commerce application and communicating the rejection to a merchant computing device associated with a merchant of the at least one item, wherein the merchant computing device facilitates a refund of a payment associated with the at least one item responsive the rejection at the customer location;
determining, by the at least one mobile computing device, an amount of the refund in response to communicating the rejection to the merchant computing device; and
initiating, by the at least one mobile computing device, the refund to the customer at the customer location.

2. The non-transitory computer-readable medium of claim 1, wherein the rejection of the at least one item results in an update of an inventory maintained in the merchant computing device.

3. The non-transitory computer-readable medium of claim 1, wherein the method further comprises sending, by the at least one mobile computing device, a notification of a failure to deliver the at least one item at the customer location to the merchant computing device.

4. The non-transitory computer-readable medium of claim 1, wherein the method further comprises facilitating, by the at least one mobile computing device, a communication between the at least one mobile computing device associated with the courier and the customer, wherein a contact information of the customer is made anonymous with respect to the courier.

5. The non-transitory computer-readable medium of claim 1, wherein the method further comprises rendering, by the at least one mobile computing device, in the user interface a communication link to the merchant of one of the plurality of items, the communication link being configured to enable the courier to negotiate an adjusted price authorized by the merchant at the customer location, wherein the courier is a separate entity from the merchant.

6. The non-transitory computer-readable medium of claim 1, wherein receiving the rejection further comprises receiving at least one rejection type, the at least one rejection type indicating a reason for the rejection.

7. A system, comprising:
a global positioning system (GPS) receiver;
an elevation sensor;
at least one mobile computing device associated with a courier, wherein the at least one mobile computing device is in communication with the GPS receiver and the elevation sensor; and
a courier application executable in the at least one mobile computing device, wherein, when executed, the courier application causes the at least one mobile computing device to perform a method comprising:
retrieving, by the at least one mobile computing device, a list of stops from a courier computing device, the list of stops identifying a plurality of orders to be delivered, individual ones of the plurality of orders being associated with a customer location and a customer, the customer location being expressed as a latitudinal value, a longitudinal value, and an elevation value, wherein at least one of the plurality of orders specifies a plurality of items;
receiving, by the at least one mobile computing device, system location data from the GPS receiver and the elevation sensor;
rendering, by the at least one mobile computing device, on a display of the at least one mobile computing device a user interface including at least a portion of the list of stops;
rendering, by the at least one mobile computing device, a courier route to the customer location on a map in the user interface based at least in part on the system location data and the customer location;
facilitating, by the at least one mobile computing device, a rejection of at least one item among the plurality of items via the user interface at the customer location;
communicating, by the at least one mobile computing device over a wireless network, the rejection at the customer location to the courier computing device in response to receiving the rejection, the courier computing device executing an electronic commerce application and communicating the rejection to a merchant computing device associated with a merchant of the at least one item to facilitate a refund of a payment associated with the at least one item responsive to the rejection at the customer location;
determining, by the at least one mobile computing device, an amount of the refund in response to communicating the rejection to the merchant computing device; and
initiating, by the at least one mobile computing device, the refund to the customer at the customer location.

8. The system of claim 7, wherein facilitating the rejection further comprises receiving, by the at least one mobile computing device, at least one rejection type, the at least one rejection type indicating a reason for the rejection.

9. The system of claim 8, wherein the method further comprises communicating, by the at least one mobile computing device, the at least one rejection type to the merchant that is associated with the at least one order.

10. The system of claim 7, wherein facilitating the rejection further comprises receiving, by the at least one mobile computing device, an audio input to specify a reason for the rejection.

11. The system of claim 7, wherein the user interface is configured to receive a selection of a subset of items among the plurality of items to specify the rejection.

12. A method, comprising:
retrieving, by at least one mobile computing device associated with a courier, a list of stops from a courier computing device, the list of stops identifying a plurality of orders to be delivered, individual ones among the plurality of orders being associated with a customer location and a customer, the customer location being expressed as a latitudinal value, a longitudinal value, and an elevation value, wherein at least one order among the plurality of orders specifies a plurality of items;
receiving, by the at least one mobile computing device, system location data from a global position system (GPS) receiver and an elevation sensor;
rendering, by the at least one mobile computing device, on a display of the at least one mobile computing device a user interface including at least a portion of the list of stops;
rendering, by the at least one mobile computing device, a courier route to the customer location on a map in the user interface based at least in part on the system location data and the customer location;
facilitating, by the at least one mobile computing device, a rejection of at least one item among the plurality of items via the user interface at the customer location;
communicating, by the at least one mobile computing device over a wireless network, the rejection at the customer location to the courier computing device to facilitate a refund of a payment associated with the at least one item responsive to receiving the rejection, the courier computing device executing an electronic commerce application and communicating the rejection to a merchant computing device being associated with a merchant of the at least one item, wherein the merchant computing device facilitates the refund responsive to the rejection at the customer location;

determining, by the at least one mobile computing device, an amount of the refund in response to communicating the rejection to the computing device; and initiating, by the at least one mobile computing device, the refund to the customer at the customer location.

13. The method of claim 12, wherein facilitating the rejection comprises receiving an indication at the customer location that the at least one item is rejected.

14. The method of claim 12, wherein facilitating the rejection comprises receiving at least one rejection type, the at least one rejection type specifying a reason for the rejection.

15. The method of claim 14, further comprising communicating the at least one rejection type to the merchant that is associated with the at least one order.

16. The method of claim 12, wherein facilitating the rejection comprises receiving an audio input to indicate a reason for the rejection.

17. The method of claim 12, wherein the user interface is configured to receive a selection of a subset of items among the plurality of items to specify the rejection.

18. The method of claim 12, wherein the map comprises the customer location associated with individual ones of the portion of the list of stops being rendered in the user interface.

19. The method of claim 18, further comprising automatically adjusting, by the at least one mobile computing device, the map of the customer location associated with the individual ones of the portion of the list of stops in response to updating the portion of the list of stops being rendered.

20. The method of claim 12, wherein determining the amount of the refund is based at least in part on account promotions being rescinded and paid taxes.

* * * * *